US012677151B2

(12) United States Patent
Ferdi

(10) Patent No.: US 12,677,151 B2
(45) Date of Patent: Jul. 7, 2026

(54) PDU SESSION SECONDARY AND SLICE-SPECIFIC AUTHENTICATION AND AUTHORIZATION USING L3 WTRU-TO-NETWORK RELAY

(71) Applicant: InterDigital Patent Holdings, Inc., Wilmington, DE (US)

(72) Inventor: Samir Ferdi, Kirkland (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 140 days.

(21) Appl. No.: 18/850,382

(22) PCT Filed: Mar. 24, 2023

(86) PCT No.: PCT/US2023/016211
§ 371 (c)(1),
(2) Date: Sep. 24, 2024

(87) PCT Pub. No.: WO2023/183562
PCT Pub. Date: Sep. 28, 2023

(65) Prior Publication Data
US 2025/0220425 A1      Jul. 3, 2025

Related U.S. Application Data

(60) Provisional application No. 63/323,760, filed on Mar. 25, 2022.

(51) Int. Cl.
*H04L 9/40*          (2022.01)
*H04W 12/069*        (2021.01)

(52) U.S. Cl.
CPC ................................. *H04W 12/069* (2021.01)

(58) Field of Classification Search
CPC ........... H04W 12/069; H04W 12/0431; H04W 12/06; H04W 12/068; H04W 12/0433; H04W 88/04; H04W 92/18
See application file for complete search history.

(56) References Cited

U.S. PATENT DOCUMENTS

2021/0250843 A1*  8/2021  Baek ........................ H04W 8/24
2021/0345104 A1*  11/2021  Cheng ............... H04W 12/0433
(Continued)

FOREIGN PATENT DOCUMENTS

WO      WO 2021/034093 A1      2/2021
WO      WO 2021/230867 A1      11/2021

OTHER PUBLICATIONS

3rd Generation Partnership Project; "Technical Specification Group Services and System Aspects; Study on enhanced security for Network Slicing Phase 2; (Release 17)", 3GPP TR 33.874 V0.6.0, Feb. 2022, 12 pages.

(Continued)

*Primary Examiner* — Thaddeus J Plecha
(74) *Attorney, Agent, or Firm* — Flaster Greenberg P.C.

(57)          ABSTRACT

A wireless transmit/receive unit (WTRU) may be configured to receive a key identifier. The key identifier may be associated with a second WTRU. Additionally, or alternatively, the key identifier may include a 5G ProSe remote user key (5GPRUK) identifier (ID). The WTRU may be configured as a WTRU-to-network relay for the second WTRU. The key identifier may be received during a key request procedure. The key request procedure may be performed by the WTRU on behalf of the second WTRU. The WTRU may be configured to send the key identifier to a network function. The key identifier may be sent to the network function to initiate a secondary authentication procedure. The WTRU may be configured to receive an authentication response message from the second WTRU. The WTRU may be configured to receive a response from the network function.

20 Claims, 11 Drawing Sheets

(56) References Cited

U.S. PATENT DOCUMENTS

2022/0279348 A1    9/2022  Youn et al.
2025/0016560 A1*   1/2025  Kim .................. H04W 12/0431

OTHER PUBLICATIONS

3rd Generation Partnership Project; "Technical Specification Group Services and System Aspects; Security architecture and procedures for 5G system (Release 17)", 3GPP TS 33.501 V17.4.2, Jan. 2022, 287 pages.

3rd Generation Partnership Project; "Technical Specification Group Services and System Aspects; Security Aspects of Proximity based Services (ProSe) in the 5G System (5GS) (Release 17)", 3GPP TS 33.503 V0.3.0, Mar. 2022, 42 pages.

3rd Generation Partnership Project; "pCR to TS33.503 Clause 6.3 Update security procedure over Control Plane", CATT, S3-220211, 3GPP TSG-SA3 Meeting #106-e, e-meeting, Feb. 14-25, 2022, 3 pages.

3rd Generation Partnership Project; "NSSAA for Remote UE with L3 U2N relay without N3IWF", Interdigital, LG Electronics, S3-220080, 3GPP TSG-SA3 Meeting #106e e-meeting, Feb. 14-25, 2022, 4 pages.

3rd Generation Partnership Project; "Alternative solution to handle PRUK and PRUK ID", Ericsson, S3-220371, 3GPP TSG-SA3 Meeting #106-e e-meeting, Feb. 14-25, 2022, 5 pages.

3rd Generation Partnership Project, "Long term identifier updates for UE-to-NW relays", S3-220442 3GPP TSG SA WG3 #106e Philips International B.V., Feb. 14-18, 2022, 7 pages.

LG Electronics, Interdigital, "EN resolution for secondary authentication without N3IWF (Alt2)", S3-220816, 3GPP TSG-SA3 Meeting #107e, e-meeting, May 16-20, 2022, 7 pages.

LG Electronics, Interdigital, "EN resolution for secondary authentication without N3IWF (Alt2)", S3-221174, 3GPP TSG-SA3 Meeting #107e, e-meeting, May 16-20, 2022, 7 pages.

* cited by examiner

PDU SESSION SECONDARY AND SLICE-SPECIFIC AUTHENTICATION AND AUTHORIZATION USING L3 WTRU-TO-NETWORK RELAY

CROSS REFERENCE TO RELATED APPLICATIONS

This application is the 371 National Stage of International Application No. PCT/US2023/016211, filed Mar. 24, 2023, which claims the benefit of U.S. Provisional Patent Application No. 63/323,760, filed Mar. 25, 2022, which is hereby incorporated by reference in its entirety.

BACKGROUND

Certain security procedures over the control plane have been specified for 5G proximity services (ProSe) associated with a remote wireless transmit/receive unit (WTRU) and relay WTRU authorization and PC5 link security. For example, the remote WTRU and relay WTRU authorization and PC5 link security may be based on a remote WTRU authentication (e.g., by the network via a relay WTRU during PC5 link establishment).

SUMMARY

A first wireless transmit/receive unit (WTRU) may be configured to receive a key identifier. The key identifier may be associated with a second WTRU. Additionally, or alternatively. For example, the key identifier may include a 5G ProSe remote user key (5GPRUK) identifier (ID) associated with the second WTRU. The first WTRU may be configured as a WTRU-to-network relay for the second WTRU. For example, the first WTRU may be a Relay WTRU and the second WTRU may be a Remote WTRU. The key identifier may be received during a key request procedure. The key request procedure may be performed by the first WTRU on behalf of the second WTRU.

The first WTRU may be configured to send the key identifier to a network function. The key identifier may be sent to the network function to initiate a secondary authentication procedure (e.g., a slice-specific authentication procedure). For example, the key identifier may be sent to the network function to initiate a secondary authentication procedure on behalf of the second WTRU. The first WTRU may be configured to receive an authentication message (e.g., from the network function). The authentication message may include the key identifier, which may be used to determine that the authentication message is associated with the second WTRU. Additionally, or alternatively, the first WTRU may be configured to send the authentication message to the second WTRU. For example, the first WTRU may be configured to send the authentication message to the second WTRU based on the authentication message including the key identifier. The network function may be identified by an access and mobility function (AMF) or session management function (SMF). The AMF may transmit the key identifier to the SMF. For example, the SMF may transmit the key identifier to a ProSe Anchor Function (PAnF) or ProSe Key Management Function (PKMF).

The first WTRU may be configured to receive an authentication response message from the second WTRU. The authentication response message may include the key identifier. Additionally, or alternatively, the first WTRU may be configured to receive a response from the network function. The response may include the key identifier. Additionally, or alternatively, the response may indicate a result of the secondary authentication procedure. The key identifier may be sent to the network function in a Remote WTRU report message. The response may include a Remote WTRU report response message. The first WTRU may be configured to transmit an indication that the second WTRU is authorized to communicate via a link or to release the link. For example, the first WTRU may be configured to, based on the Remote WTRU report response message, transmit an indication that the second WTRU is authorized to communicate via a link or to release the link. The link may be a PC5 link.

A base station may be configured to receive a key identifier. The key identifier may be received from a first WTRU. The key identifier may be associated with a second WTRU. The first WTRU may be configured as a WTRU-to-network relay for the second WTRU. The key identifier may be received during a key request procedure. The key request procedure may be performed by the first WTRU on behalf of the second WTRU. The key identifier may be received to initiate a secondary authentication procedure on behalf of the second WTRU. The base station may be configured to transmit an authentication message. For example, the base station may be configured transmit the authentication message to the second WTRU. The authentication message may include the key identifier. The authentication message may be sent to the second WTRU via the first WTRU. For example, the authentication message may be sent to the second WTRU via the first WTRU based on the authentication message including the key identifier. The base station may be configured to transmit a response to the first WTRU. The response may include the key identifier. Additionally, or alternatively, the response may indicate a result of the secondary authentication procedure. The WTRU may release a link with the second WTRU based on the result of the secondary authentication procedure. Data network (DN) information may be retrieved from the second WTRU. For example, a secondary authentication may be triggered based on a determination of one or more of DN being authorized, DN requiring secondary authentication, and a prior authentication.

DETAILED DESCRIPTION

Figure 1A:
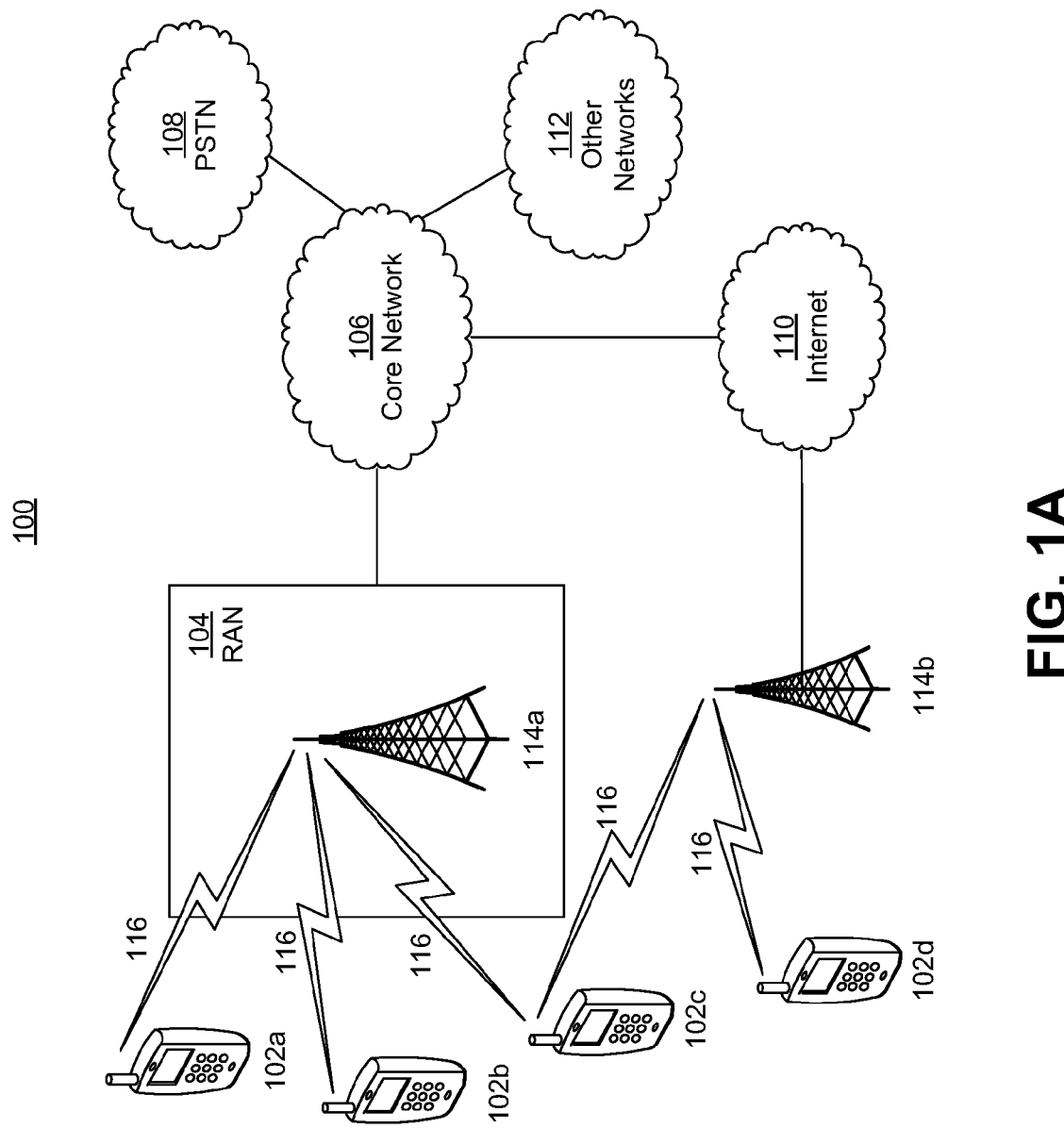
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a WTRU.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114_a_ and the WTRUs 102_a_, 102_b_, 102_c_ may implement radio technologies such as IEEE 802.11 (i.e., Wireless Fidelity (WiFi), IEEE 802.16 (i.e., Worldwide Interoperability for Microwave Access (WiMAX), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114_b_ in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114_b_ and the WTRUs 102_c_, 102_d_ may implement a radio technology such as IEEE 802.11 to establish a wireless local area network (WLAN). In an embodiment, the base station 114_b_ and the WTRUs 102_c_, 102_d_ may implement a radio technology such as IEEE 802.15 to establish a wireless personal area network (WPAN). In yet another embodiment, the base station 114_b_ and the WTRUs 102_c_, 102_d_ may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114_b_ may have a direct connection to the Internet 110. Thus, the base station 114_b_ may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102_a_, 102_b_, 102_c_, 102_d_. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102_a_, 102_b_, 102_c_, 102_d_ to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102_a_, 102_b_, 102_c_, 102_d_ in the communications system 100 may include multi-mode capabilities (e.g., the WTRUs 102_a_, 102_b_, 102_c_, 102_d_ may include multiple transceivers for communicating with different wireless networks over different wireless links). For example, the WTRU 102_c_ shown in FIG. 1A may be configured to communicate with the base station 114_a_, which may employ a cellular-based radio technology, and with the base station 114_b_, which may employ an IEEE 802 radio technology.

Figure 1B:
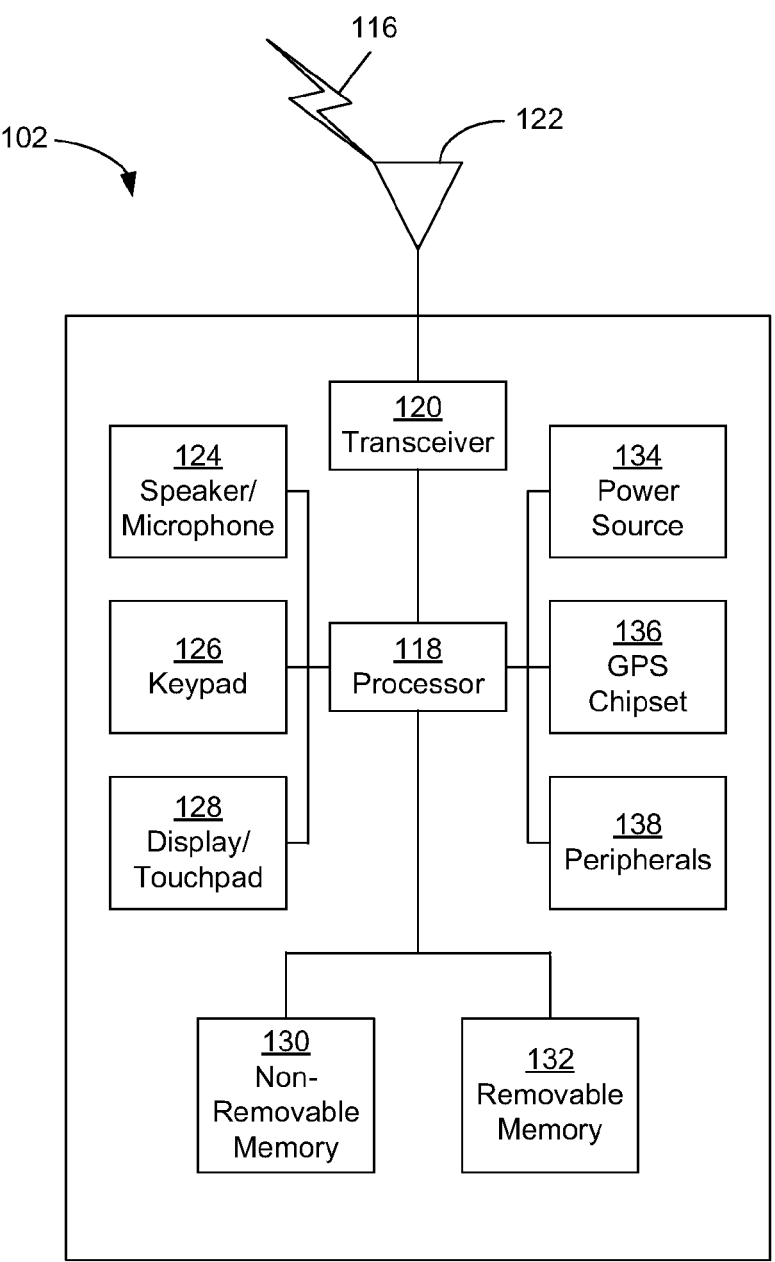
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114_a_) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception).

Figure 1C:
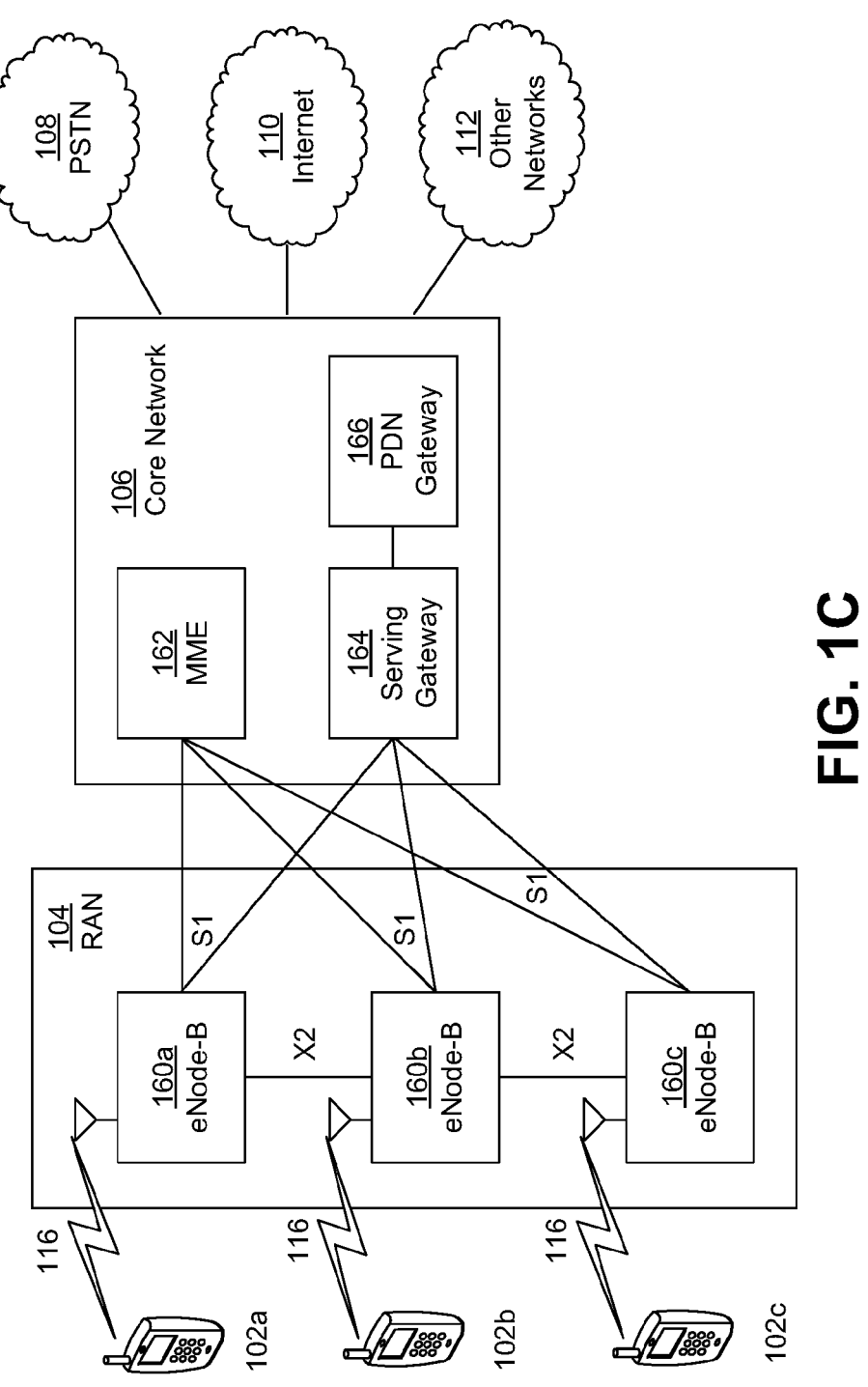
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
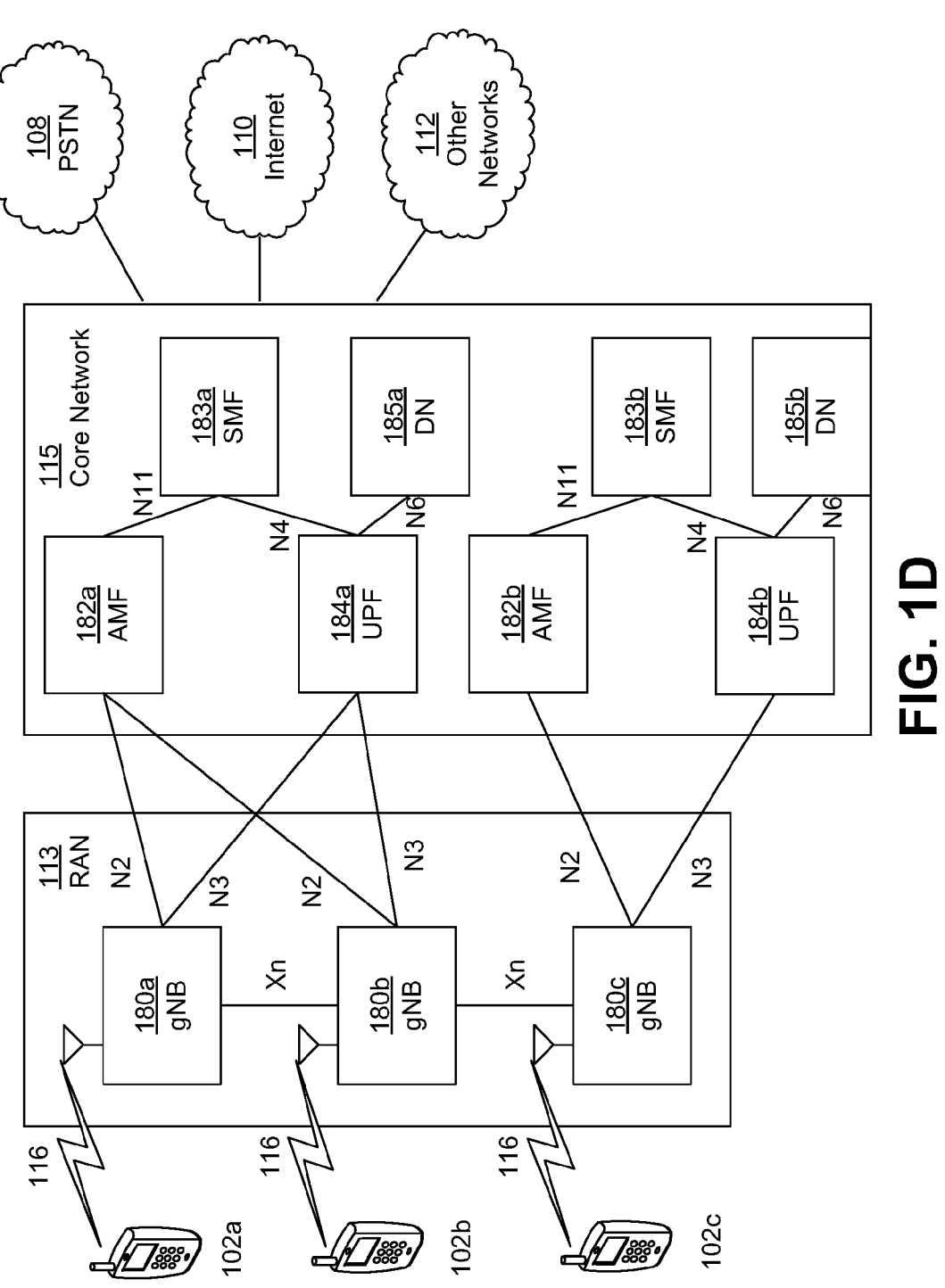
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating WTRU IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Secondary and slice-specific authentication and authorization for a protocol data unit (PDU) session may be performed, for example, using a Layer 3 WTRU-to-network relay. A Remote WTRU and a Relay WTRU may establish a PC5 link. For example, the PC5 link may be established via a security procedure (e.g., over the user plane or over the control plane). The Relay WTRU may receive and store a security key identifier associated with the Remote WTRU. For example, the security key identifier may be received from the network or from the Remote WTRU, for example, during the security procedure. The Relay WTRU may transmit a Remote WTRU report message to the Layer 3 WTRU-to-network relay (e.g., to an access and mobility function (AMF) associated with the Layer 3 WTRU-to-network relay). In some scenarios, the Relay WTRU may transmit a Remote WTRU report message to the network after the PC5 link with the Remote WTRU is established. For example, the Remote WTRU report message may include the security key identifier associated with the Remote WTRU and/or one or more identifiers associated with the established PC5 link.

The Layer 3 WTRU-to-network relay may determine whether the Remote WTRU is authorized and/or authenticated to communicate via the established PC5 link (e.g., via a network function). For example, an AMF associated with the relay may retrieve a second identifier associated with the Remote WTRU (e.g., subscription permanent identifier (SUPI)) based on the key identifier of the Remote WTRU. The AMF may transmit the second identifier associated with the Remote WTRU and/or the key identifier of the Remote WTRU to a session management function (SMF) associated with the Layer 3 WTRU-to-network relay. Alternatively, or additionally, an SMF associated with the relay may retrieve a second identifier associated with the Remote WTRU (e.g., subscription permanent identifier (SUPI), for example based on the key identifier of the Remote WTRU. The SMF may send to a PAnF or PKMF the security key identifier associated with the Remote WTRU and/or receive in response a second identifier associated with the Remote WTRU. The SMF may determine whether the Remote WTRU is authorized and/or authenticated to communicate over the established PC5 link. For example, the SMF may determine whether the Remote WTRU is authorized and/or authenticated to communicate over the established PC5 link based on the second identifier associated with the Remote WTRU. The SMF may initiate and/or perform a secondary authentication and authorization procedure of the Remote WTRU. For example, the SMF may initiate and/or perform a secondary authentication and authorization procedure of the Remote WTRU via the WTRU-to-network relay. For example, the secondary authentication and authorization procedure may include sending the key identifier of the Remote WTRU to the WTRU-to-network relay. The SMF may transmit the result of the authentication and authorization procedure to the WTRU-to-network relay. The SMF may additionally, or alternatively, transmit the security key identifier of the Remote WTRU to the WTRU-to-network relay. If the Remote WTRU is authorized and/or authenticated to communicate over the PC5 link, the Layer 3 WTRU-to-network relay may transmit an indication that the Remote WTRU is authorized and/or authenticated to communicate via the established PC5 link to the Relay WTRU. The Remote WTRU may communicate over the established PC5 link. If, in some scenarios, the Remote WTRU is not authorized or authenticated to communicate over the PC5 link, the Layer 3 WTRU-to-network relay may release the established PC5 link.

A first wireless transmit/receive unit (WTRU) may be configured to receive a key identifier. The key identifier may be associated with a second WTRU. The key identifier may point to a key and/or be generated as random bits. For example, the key identifier may be used to determine an identifier associated with the Remote WTRU (e.g., via a lookup table maintained by the network and/or the relay), such as, the Remote WTRU's SUPI. The key identifier may be used and/transmitted over the network instead of the remoter WTRU's SUPI, for example, to maintain security throughout over the network and/or the network relay. In certain scenarios, for example, the key identifier may include a 5G ProSe remote user key (5GPRUK) identifier (ID). The first WTRU may be configured as a WTRU-to-network relay for the second WTRU. The key identifier may be received during a key request procedure. The key request procedure may be performed by the first WTRU on behalf of the second WTRU.

The first WTRU may be configured to send the key identifier to a network function. The key identifier may be sent to the network function to initiate a secondary authentication procedure. For example, the key identifier may be sent to the network function to initiate a secondary authentication procedure on behalf of the second WTRU. The first WTRU may be configured to receive an authentication message. The authentication message may include the key identifier. Additionally, or alternatively, the first WTRU may be configured to send the authentication message to the second WTRU. For example, the first WTRU may be configured to send the authentication message to the second WTRU based on the authentication message including the key identifier. The network function may be identified by an access and mobility function (AMF) and/or a session management function (SMF). The AMF may transmit the key identifier to the SMF. The SMF may transmit the key identifier to a ProSe Anchor Function (PAnF) and/or ProSe Key Management Function (PKMF).

The first WTRU may be configured to receive an authentication response message from the second WTRU. The authentication response message may include the key identifier. Additionally, or alternatively, the first WTRU may be configured to receive a response from the network function.

The response may include the key identifier. Additionally, or alternatively, the response may indicate a result of the secondary authentication procedure. The key identifier may be sent to the network function in a Remote WTRU report message. The response may include a Remote WTRU report response message. The first WTRU may be configured to transmit an indication that the second WTRU is authorized to communicate via a link or to release the link. For example, the first WTRU may be configured to, based on the Remote WTRU report response message, transmit an indication that the second WTRU is authorized to communicate via a link or to release the link. The link may be a PC5 link.

A base station may be configured to receive a key identifier. The key identifier may be received from a first WTRU. The key identifier may be associated with a second WTRU. The first WTRU may be configured as a WTRU-to-network relay for the second WTRU. The key identifier may be received during a key request procedure. The key request procedure may be performed by the first WTRU on behalf of the second WTRU. The key identifier may be received to initiate a secondary authentication procedure on behalf of the second WTRU. The base station may be configured to transmit an authentication message. For example, the base station may be configured transmit the authentication message to the second WTRU. The authentication message may include the key identifier. The authentication message may be sent to the second WTRU via the first WTRU. For example, the authentication message may be sent to the second WTRU via the first WTRU based on the authentication message including the key identifier. The base station may be configured to transmit a response to the first WTRU. The response may include the key identifier. Additionally, or alternatively, the response may indicate a result of the secondary authentication procedure. The WTRU may release a link with the second WTRU based on the result of the secondary authentication procedure. Distinguished name (DN) information may be retrieved from the second WTRU. For example, a secondary authentication may be triggered based on a determination of one or more of DN being authorized, DN requiring secondary authentication, and a prior authentication.

Security procedures associated with 5G proximity services (ProSe) Communication may be implemented. For example, security procedures associated with 5G ProSe Communication may be implemented via 5G ProSe (e.g., such as 5G ProSe Layer-3 WTRU-to-network relay). The security procedures may be implemented over the control plane, for example.

Certain security procedures over the control plane may be specified for 5G ProSe. The security procedures may be associated with one or more of a Remote WTRU (e.g., an out-of-coverage WTRU), a Relay WTRU (e.g., an in-coverage WRU) authorization, and PC5 link security. For example, the Remote WTRU and Relay WTRU authorization and/or PC5 link security may be based on a Remote WTRU authentication (e.g., by the network via a Relay WTRU during PC5 link establishment).

A Relay WTRU may receive a protected permanent identifier (e.g., a subscription permanent Identifier (SUCI). The Relay WTRU may receive the protected permanent identifier in a direct communication request (DCR) message. The Relay WTRU may forward the SUCI in a key request message. The key request message may be used to obtain a key from the network. The network may trigger a Remote WTRU authentication via a relay link (e.g., the PC5 link). Triggering a Remote WTRU authentication via a relay link may be similar to a primary authentication procedure performed over the Uu interface. The Remote WTRU and/or the network may establish a 5G ProSe Remote User Key (5GPRUK)/5GPRUK identifier from this authentication. The 5GPRUK ID may be used for (e.g., as) an authentication mechanism, for example for a data network. Additionally, or alternatively, the 5GPRUK ID may be used for routing one or more messages for the Relay WTRU. The Relay WTRU may receive a shared key derived from the 5GPRUK from the network, and/or may establish the security of the PC5 link with the Remote WTRU based on the shared key.

A Remote WTRU may provide a key identifier (e.g., 5GPRUK ID) via DCR. In certain implementations, a Remote WTRU may provide a 5GPRUK ID via DCR (e.g., if available), for example, instead of SUCI (e.g., as a possible optimization, such that Remote WTRU authentication procedures are not performed). For example, the 5GPRUK may be located and/or retrieved based on a provided 5GPRUK ID.

Security procedures (e.g., certain security procedures) may be implemented over the user plane. For example, security procedures implemented over user plane may be specified in 5G ProSe and/or may include procedures for one or more of the Remote WTRU, Relay WTRU authorization, and PC5 link security. The security procedures may be based on, for example, the Remote WTRU transmitting a 5GPRUK ID (e.g., via DCR). The Remote WTRU may obtain a 5GPRUK/5GPRUK ID from a ProSe Key Management Function (PKMF). For example, the Remote WTRU may obtain a 5GPRUK/5GPRUK ID from a PKMF over a user plane connection (e.g., prior to the PC5 link establishment and/or during PC5 link establishment using a Generic Bootstrapping Architecture (GBA) push mechanism).

A Relay WTRU may receive a 5GPRUK ID and/or SUCI. For example, the Relay WTRU may receive a 5GPRUK ID and/or SUCI via a DCR message. The Relay WTRU may forward the 5GPRUK ID and/or SUCI, for example, in a key request message to a PKMF associated with a Remote WTRU (e.g., via the Relay WTRU's PKMF over the user plane). The Relay WTRU may receive a shared key. The shared key may be derived from the 5GPRUK received from the Remote WTRU's PKMF (e.g., via PKMF associated with a Relay WTRU). The Relay WTRU may establish the security of the PC5 link with the Remote WTRU based on the shared key.

In certain scenarios, Remote WTRU secondary authentication procedures may be performed. In some examples, a secondary authentication procedure may be associated with (e.g., specific to) the DN. Remote WTRU secondary procedures may be performed via a 5G ProSe Layer-3 WTRU-to-network relay (e.g., without a Non-3GPP Interworking Function (N3IWF)). For example, certain organizations (e.g., 3GPP) may be defining procedures for a remote WRTU to access a Data Network (DN) that may require secondary authentication. For example, secondary authentication may be via a L3 WTRU-to-network relay based on a Remote WTRU authentication by the network via the Relay WTRU (e.g., as described herein). Remote authentication by the network via the Relay WTRU may be followed by a PDU session secondary authentication and/or authorization by a DN (e.g., as part of the PC5 link establishment).

A Remote WTRU may perform network slice specific authentication and/or authorization (NSSAA). For example, the Remote WTRU may perform NSSAA via a 5G ProSe Layer-3 WTRU-to-network relay (e.g., without N3IWF). Certain organizations (e.g., 3GPP) have studied procedures for a Remote WTRU to access a single-network slice selection assistance information (S-NSSAI) that is subject to NSSAA. For example, the Remote WTRU to access a S-NSSAI via a L3 WTRU-to-network relay based on a Remote WTRU authentication by the network via the relay (as described herein). Additionally, or alternatively, the Remote WTRU may access a S-NSSAI followed by a NSSAA procedure as part of the PC5 link establishment.

Secondary authentication and/or NSSAA may be implemented, for example, using the control plane. For example, certain implementations support access to a DN. Access to the DN may require secondary authentication (e.g., or to an S-NSSAI subject to NSSAA). Secondary authentication may be via a L3 WTRU-to-network relay. In some implementations, a Remote WTRU may provide a SUCI and/or a 5G-Globally Unique Temporary ID (GUTI). The SUCI and/or GUTI may be provided via a DCR message. For example, SUCI or 5G-GUTI WTRU may be used by the serving network associated with the Relay WTRU. For example, SUCI or 5G-GUTI WTRU may be used by the serving network associated with the Relay WTRU to access the subscription information associated with the Remote WTRU (e.g., which may be used for secondary authentication and/or NSSAA procedures).

A Remote WTRU may send SUCI in DCR. The Remote WTRU may send SCI in DCR if, for example, the Remote WTRU intends to connect for a relay service (RSC) (e.g., for the first time). In some scenarios, the Remote WTRU may perform an authentication by the network. The Remote WTRU may be enabled to (re)connect to a relay service (e.g., if the (re)connection has been authorized from a prior connection, which may avoid the potential signaling overhead associated with re-running an authentication procedure with network).

In some scenarios, the 5G-GUTI may be used by the network (e.g., AMF associated with the Remote WTRU). For example, the 5G-GUTI may be used by the network to determine the Remote WTRU context. The Remote WTRU context may include the Remote WTRU Subscription Permanent Identifier (SUPI). 5G-GUTI may be used when the Remote WTRU is registered in the same Public Land Mobile Network (PLMN) as the Relay WTRU (e.g., so that the context information associated with the Remote WTRU can be exchanged with the AMF associated with the Relay WTRU).

A Remote WTRU may (re)connect to a given relay service. For example, the Remote WTRU may (re)connect to a given relay service without performing an authentication procedure. This connection may enable the network (e.g., AMF, SMF) to access the subscription information associated with the Remote WTRU (e.g., without sending the SUCI associated with the Remote WTRU in DCR). Techniques described herein may enable access (e.g., via a relay) to a DN that implements secondary authentication. Techniques may enable access (e.g., via a relay) to an S-NSSAI. Access to the S-NSSAI may be subject to NSSAA for a Remote WTRU, for example, (e.g., without a Remote WTRU performing an authentication procedure with the network and/or SUPI concealment/de-concealment processing).

Secondary Authentication and/or NSSAA may be implemented using the user plane. A Remote WTRU may be provided with access to a DN. The DN may implement secondary authentication and/or an S-NSSAI subject to NSSAA. For example, implementation of secondary authentication and/or an S-NSSAI may be subject to NSSAA via a L3 WTRU-to-network relay (e.g., when use of the user plane is not supported). Some security procedures over the user plane may rely on a Remote WTRU obtaining a 5GPRUK/5GPRUK ID from a PKMF (e.g., using a user plane connection). These security procedures may not use a Remote WTRU authentication by the network (e.g., as in the case of the control plane based approach). Some security procedures additionally, or alternatively, may not define mechanisms to enable a serving network associated with the Relay WTRU to access a subscription information associated with the Remote WTRU and/or mechanisms to perform Remote WTRU PDU session secondary authentication and/or NSSAA via a L3 Relay (e.g., without N3IWF). Techniques described herein may enable access (e.g., via a relay) to a DN that implement secondary authentication. For example, secondary authentication may be implemented when using security procedures over the user plane. Some techniques described herein may enable access (e.g., via a relay) to an S-NSSAI. The access may be subject to NSSAA for a Remote WTRU (e.g., when using security procedures over the user plane).

A Layer 3 WTRU-to-network relay may be provided. One or more of the following may apply. The Layer 3 WTRU-to-network relay may enable access to a DN that requires secondary authentication and/or access to S-NSSAI. For example, secondary authentication and/or access to S-NSSAI may be subject to NSSAA during PC5 Link establishment. The Layer 3 WTRU-to-network relay may receive and/or store a 5GPRUK ID associated with a Remote WTRU and/or the network. For example, the Layer 3 WTRU-to-network relay may receive and/or store a 5GPRUK ID associated with a Remote WTRU and/or the network during PC5 link establishment. A Relay WTRU may, for example, transmit the 5GPRUK ID in a Remote WTRU report message. The Layer 3 WTRU-to-network relay may exchange one or more authentication messages for the Remote WTRU with the network. For example, the one or more authentication messages may include the 5GPRUK ID associated with the Remote WTRU. The Relay WTRU may receive a Remote WTRU report response message. For example, the report response may include the 5GPRUK ID. Additionally, or alternatively, the report response may include authentication and/or authorization results for the Remote WTRU. The Relay WTRU may provide access to the PDU session with the Remote WTRU (e.g., based on the result in the response message).

A session management function (SMF) associated with the Relay WTRU may perform a secondary authentication of the Remote WTRU. For example, secondary authentication of the Remote WTRU may be via the Relay WTRU. One or more of the following may apply. The SMF may initiate a Remote WTRU secondary authentication procedure (e.g., via a relay). For example, the Remote WTRU secondary authentication procedure may be in response to receiving a Remote WTRU report message. The Remote WTRU report message may include a SUPI and/or 5GPRUK ID. The SMF may exchange one or more PDU session secondary authentication messages. The one or more PDU session secondary authentication messages may be associated with the Remote WTRU connected to the Relay WTRU. For example, the PDU session secondary authentication messages associated with the Remote WTRU may include the 5GPRUK ID associated with the Remote WTRU. The SMF may store the authentication result (e.g., the final authentication result) in the relay context/Unified Data Management (UDM). The SMF may transmit a Remote WTRU report response message to the Relay WTRU. The report response message may include the 5GPRUK ID and/or the authentication result. Additionally, or alternatively, the report response message may include one or more authorization results for the Remote WTRU.

An access and mobility function (AMF) associated with an NSSAA procedure may be provided. One or more of the following may apply. The AMF may initiate NSSAA for a Remote WTRU authentication procedure (e.g., via the relay). For example, initiation of NSSAA for a Remote WTRU authentication procedure may be in response to receiving a Remote WTRU report message. The Remote WTRU report message may include the 5GPRUK ID associated with the Remote WTRU. The AMF may retrieve a SUPI associated with the Remote WTRU. For example, retrieval of the SUPI associated with the Remote WTRU may be based on 5GPRUK ID from a network function (e.g., ProSe Anchor Function (PAnF), UDM). The AMF may exchange slice-specific authentication messages with a Relay WTRU. For example, the slice-specific authentication messages may include the 5GPRUK ID associated with the Remote WTRU. The 5GPRUK ID associated with Remote WTRU may be used for Remote WTRU authentication. The AMF may store the authentication result (e.g., the final authentication result) in the relay context/UDM. The AMF may send (e.g., forward) the Remote WTRU report message, for example to the serving SMF. The Remote WTRU report message may include an indication of the NSSAA associated with the Remote WTRU result to the SMF.

A Remote WTRU may send a 5GPRUK ID in DCR message. For example, the Remote WTRU may send a 5GPRUK ID in DCR message when connecting and/or reconnecting via a Layer 3 WTRU-to-network relay. A Relay WTRU and/or the Relay WTRU's serving network may use the 5GPRUK ID to identify the Remote WTRU in the network. The Relay WTRU's serving network may use the 5GPRUK ID to access the subscription information associated with the Remote WTRU. A Relay WTRU and/or the Relay WTRU's serving network may use the 5GPRUK ID to perform PDU session secondary authentication and/or authorization procedures. Additionally, or alternatively, the Relay WTRU and/or the serving network associated with the Relay WTRU may use the 5GPRUK ID to perform NSSAA procedures.

A Remote WTRU may be identified by a Relay WTRU's serving network. For example, the Remote WTRU may be identified by a serving network associated with the Relay WTRU based on 5GPRUK ID. The Remote WTRU (e.g., by the Relay WTRU and/or the Relay WTRU's serving network) may be identified based on a 5GPRUK ID. For example, the Relay WTRU may receive the 5GPRUK ID from the Remote WTRU in a DCR message. Additionally, or alternatively, the Relay WTRU may receive the 5GPRUK ID from the network during PC5 link establishment. The 5GPRUK ID may be generated by a network function. If, for example, the Relay WTRU receives the 5GPRUK ID from the network, the 5GPRUK ID may be generated by a network function (e.g., a network function in the Remote WTRU's home network). The 5GPRUK ID may be stored by the network. For example, the 5GPRUK ID may be stored by the network along one or more other parameters associated with ProSe context associated with the Remote WTRU (e.g., 5GPRUK, RSC, SUPI). The 5GPRUK/5GPRUK ID may be generated (e.g., by authentication function (AUSF) associated with the Remote WTRU) as part of a Remote WTRU authentication procedure, as described herein. If, for example, a security procedure over the control plane is used, the 5GPRUK/5GPRUK ID may be generated (e.g., by AUSF associated with the Remote WTRU) as part of a Remote WTRU authentication procedure, as described herein. The 5GPRUK/5GPRUK ID may be generated (e.g., by PKMF associated with the Remote WTRU) as part of a key request procedure over the user plane (e.g., prior to PC5 link establishment) and/or during PC5 link establishment (e.g., using a GBA push mechanism), as described herein. If a security procedure over the user plane is used, the 5GPRUK/5GPRUK ID may be generated (e.g., by PKMF associated with the Remote WTRU) as part of a key request procedure over the user plane (e.g., prior to PC5 link establishment) and/or during PC5 link establishment (e.g., using a GBA push mechanism), as described herein. The relay may store the 5GPRUK ID. The relay may associate the 5GPRUK ID with the PC5 link established with the Remote WTRU. The relay may subsequently use the 5GPRUK ID (e.g., with Remote WTRU secondary authentication and/or NSSAA procedures).

Figure 2:
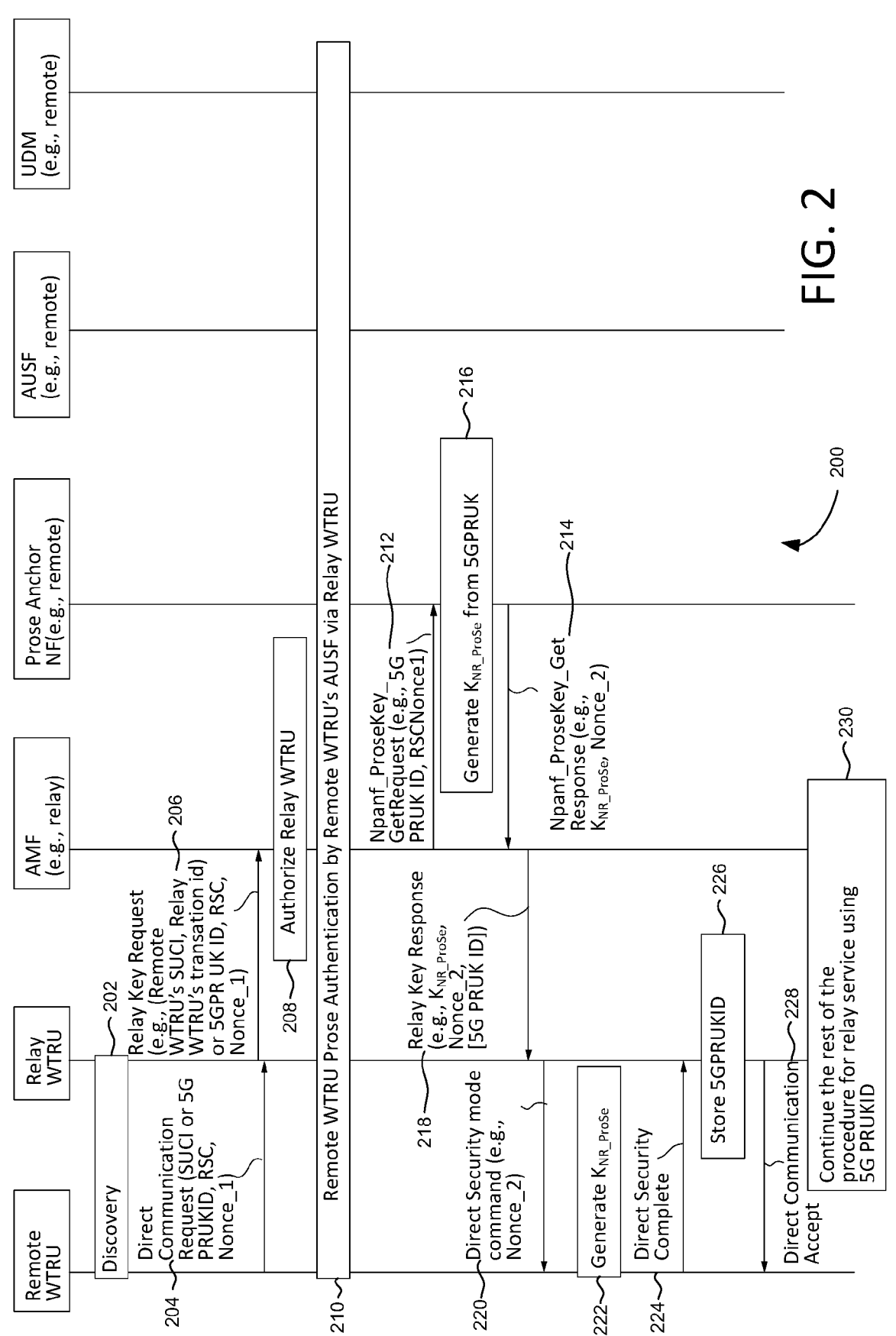
FIG. 2 illustrates an example associated with a 5GPRUK/5GPRUK ID exchange between a Remote WTRU, Relay WTRU, and the network using the control plane.

One or more security procedures may be performed over the control plane. FIG. 2 depicts an example 200 associated with a key identifier (e.g., 5GPRUK/5GPRUK ID) exchange between a Remote WTRU, Relay WTRU, and the network using the control plane (e.g., control plane approach). As illustrated in FIG. 2, a Remote WTRU and/or a Relay WTRU may perform a discovery procedure 202. At 204, the Remote WTRU may transmit a direct communication request (DCR) message to the Relay WTRU. The DCR may include the SUCI and/or 5GPRUK ID. For example, the DCR message transmitted by the Remote WTRU to the Relay WTRU may additionally, or alternatively, include other parameters (e.g., RSC, nonce). At 206, the Relay WTRU may transmit a relay key request message to the AMF. The relay key request message may include the information received from the Remote WTRU (e.g., SUCI, 5GPRUK ID, RSC, and/or nonce)

As shown in FIG. 2, the AMF may determine whether the Relay WTRU is authorized to provide the relay service. At 208, the AMF may initiate a Remote WTRU authentication procedure with the AUSF associated with the Remote WTRU. If, for example, a SUCI is provided in the relay key request, the AMF may initiate a Remote WTRU authentication procedure with the AUSF associated with the Remote WTRU. Additionally, or alternatively, at 210, the AMF may not initiate a Remote WTRU authentication procedure with the AUSF associated with the Remote WTRU. For example, if a 5GPRUK ID is provided in the relay key request, the AMF may not initiate a Remote WTRU authentication procedure with the AUSF associated with the Remote WTRU. A new 5GPRUK/5GPRUK ID (e.g., a new 5GPRUK/5GPRUK ID) may be generated by the Remote WTRU and/or the AUSF associated with the Remote WTRU, for example at 216. The AUSF associated with the Remote WTRU may store the resulting 5GPRUK/5GPRUK ID in a network function (e.g., PAnF, UDM), and/or transmit the 5GPRUK ID to AMF. For example, after the authentication procedure is completed, the AUSF associated with the Remote WTRU may store the resulting 5GPRUK/5GPRUK ID in a network function (e.g., PAnF, UDM), and/or transmit the 5GPRUK ID to AMF.

As illustrated in FIG. 2, at 212 the AMF may transmit a request message to a ProSe anchor network function (PAnF). For example, the request message may include the 5GPRUK ID and/or other parameters included in the relay key request received from the Relay WTRU. At 214, the AMF may receive a response to the request message (e.g., from the PAnF). The response request message may include ProSe key material (e.g., ProSe key, nonce). At 218, the Relay WTRU may receive a relay key response message from AMF. The relay key response message may be after the response request message. For example, the relay key response message may include the ProSe key material and/or a new 5GPRUK ID (e.g., as previously generated). For example, the key may be generated by the Remote WTRU, for example at 222.

At 220, the WTRU-to-network relay may perform a security procedure. The security procedure may be a direct security mode command (DSMC). Alternatively, or additionally, the Remote WTRU may use the ProSe key material received via the relay key response message. The direct security procedure may complete, for example at 224. At 226, the WTRU-to-network relay may store the 5GPRUK ID (e.g., received as described herein) and/or associate the 5GPRUK ID with the PC5 link established with the Remote WTRU. At 228, the WTRU-to-network relay may transmit a direct communication accept (DCA) message. The DCA message may be transmitted to the Remote WTRU. The DCA message may be used to complete PC5 link establishment. As described herein, the WTRU-to-network relay may use the 5GPRUK ID when initiating subsequent procedures (e.g., secondary authentication and authorization procedures and/or NSAA), for example at 230.

FIGS. 3A-3B, 4A-4B, and 5A-5B illustrate example authentication procedures associated with a WTRU-to-network relay and a Remote WTRU. For example, FIGS. 3A-3B, 4A-4B, and 5A-5B may be used to perform PDU session secondary and slice-specific authentication and authorization for a WTRU-to-network relay. Although FIGS. 3A-3B, 4A-4B, and 5A-5B illustrate examples where the 5GPRUK ID is used as the key identifier, it should be appreciated that the techniques described herein are not limited to just that example. For example, other suitable identifiers that can be used to verify and/or determine the identity of a Remote WTRU may also or alternatively used. Similarly, while the examples illustrated in FIGS. 3A-3B, 4A-4B, and 5A-5B contemplate specific network functions (e.g., SMF, AMF), any suitable network function may also, or alternatively, be used. Likewise, although the examples illustrated in FIGS. 3A-3B, 4A-4B, and 5A-5B show the WTRU-to-network relay communicating with a single Remote WTRU, it should be understood that these techniques apply equally to when the WTRU-to-network relay is communicating with multiple Remote WTRUs and/or the Remote WTRU is communicating with multiple WTRU-to-network relays.

Figure 3A:
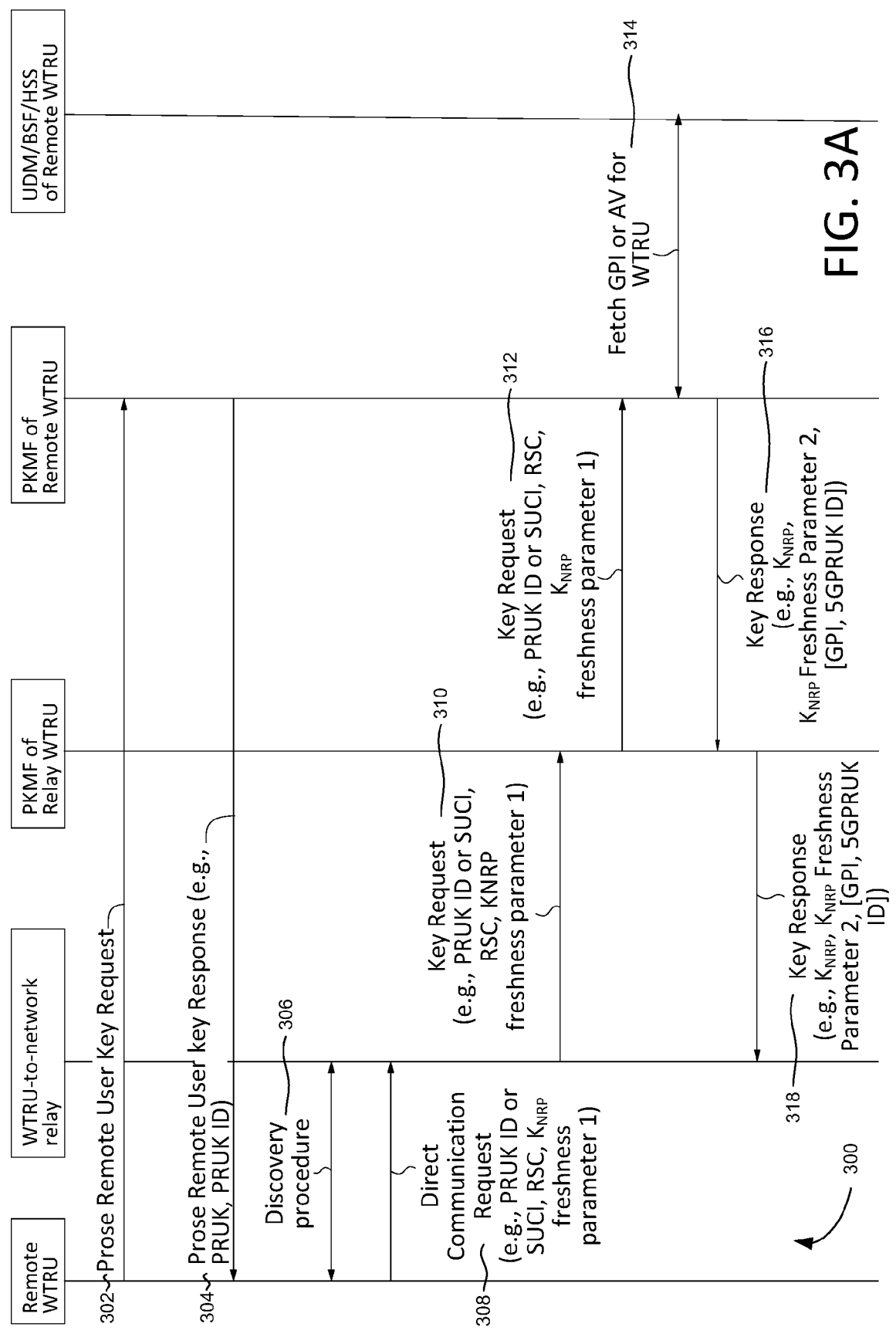
FIGS. 3A and 3B illustrate an example associated with a key identifier 5GPRUK/5GPRUK ID exchange between a Remote WTRU, WTRU-to-network relay, and the network using the user plane.
Figure 3B:
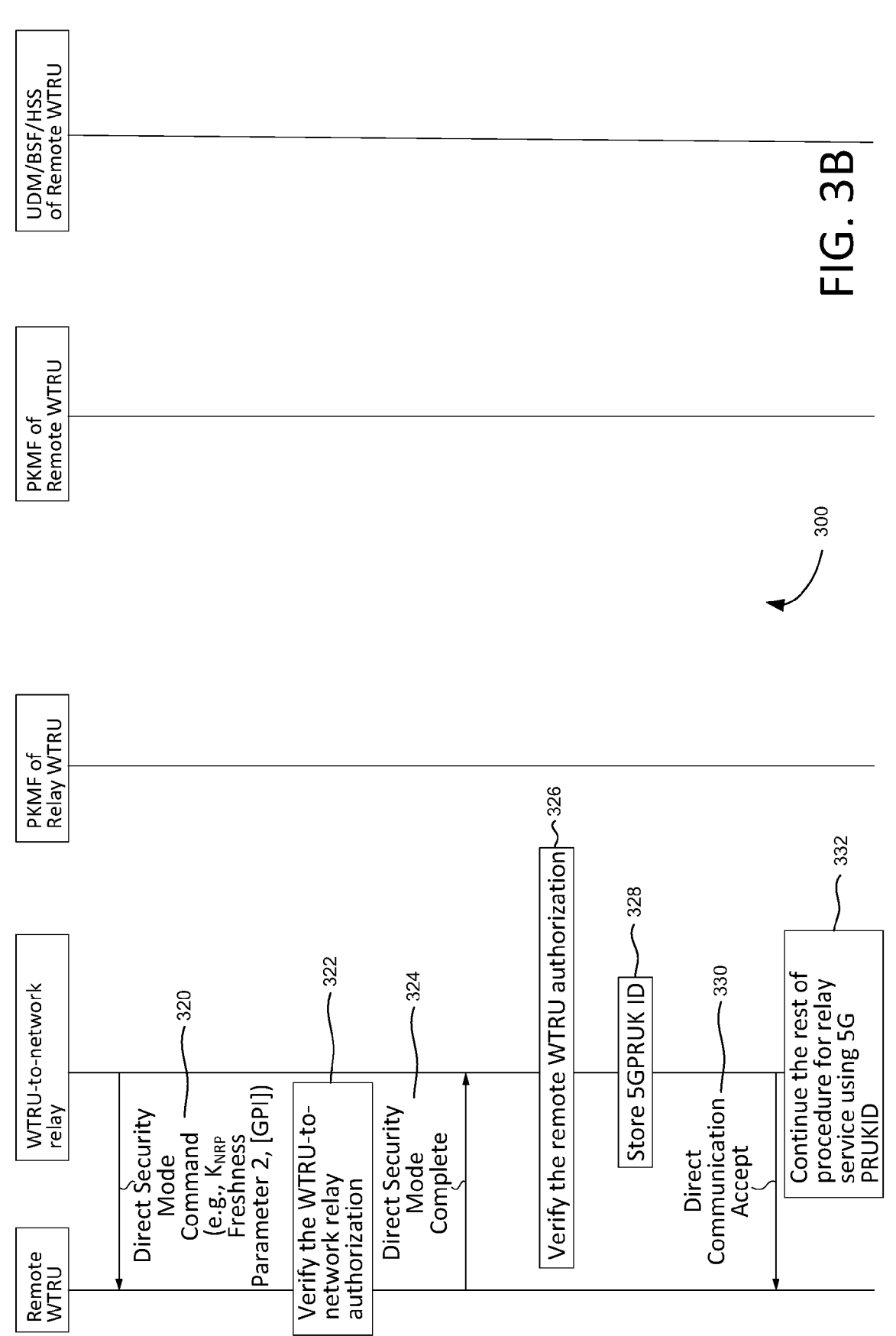

One or more security procedures may be performed over the user plane. FIGS. 3A and 3B illustrate an example 300 associated with a key identifier (e.g., 5GPRUK/5GPRUK ID) exchange between a Remote WTRU, a WTRU-to-network relay, and/or the network over the user plane approach. At 302, the Remote WTRU may send a ProSe remote user key request (e.g., over the user plane) to the ProSe key management function (PKMF) associated with the remote WTRU. At 304, the Remote WTRU may receive a response to the ProSe remote user key request. For example, the response may include a 5GPRUK/5GPRUK ID (e.g., a new 5GPRUK/5GPRUK ID) from the PKMF associated with the Remote WTRU over the user plane. At 306, the Remote WTRU and the WTRU-to-network relay may perform a discovery procedure. At 308, the Remote WTRU may transmit a DCR message (e.g., that includes information associated with the Remote WTRU and/or may be used to authenticate the Remote WTRU) to the WTRU-to-network relay. For example, the DCR message may include one or more of the SUCI (e.g., associated with the Remote WTRU), a key identifier (e.g., a 5GPRUK ID associated with the Remote WTRU), and/or one or more other parameters (e.g., RSC, nonce, associated with the Remote WTRU).

At 310, the WTRU-to-network relay may transmit a relay key request message to the PKMF associated with the WTRU-to-network relay. The relay key request may include one or more of the SUCI, 5GPRUK ID, and/or other parameters (e.g., RSC, KNRP, etc., as described herein). At 312, the PKMF associated with the WTRU-to-network relay may forward the relay key request message to the PKMF associated with the Remote WTRU. At 314, a GPI and/or AV for the WTRU may be sent from the UDM/BSF/HSS of the Remote WTRU to the PKMF of the Remote WTRU. At 316, the WTRU-to-network relay may receive a response message. The response message may include a new 5GPRUK ID. For example, if a SUCI was included in the relay key request message, the WTRU-to-network relay may receive a response message that includes a new 5GPRUK ID. The response message received by the WTRU-to-network relay may additionally, or alternatively, include ProSe key material from its PKMF (e.g., which may be forwarded from the PKMF associated with the Remote WTRU). At 318, the PKMF of the WTRU-to-network relay may send (e.g., forward) the response message to the WTRU-to-network relay.

As shown in FIG. 3B, at 320 the WTRU-to-network relay may send a direct security mode command (DSMC) procedure with the Remote WTRU, for example, using the received ProSe key material. At 322, the Remote WTRU may verify a WTRU-to-network relay authorization. At 324, the direct security mode may complete. Additionally, or alternatively, at 326 the WTRU-to-network relay may verify the Remote WTRU authorization. The WTRU-to-network relay may store the 5GPRUK ID, for example at 328. The WTRU-to-network relay may associate the 5GPRUK ID with the PC5 link established with the Remote WTRU. At 330, the WTRU-to-network relay may transmit a direct connection accept (DCA) message to the Remote WTRU. The DCA message which may be used to complete the PC5 link establishment. As described herein, for example at 332, the WTRU-to-network relay may use the 5GPRUK ID when initiating subsequent procedures 316 (e.g., secondary authentication and authorization procedures and/or NSAA).

Figure 4A:
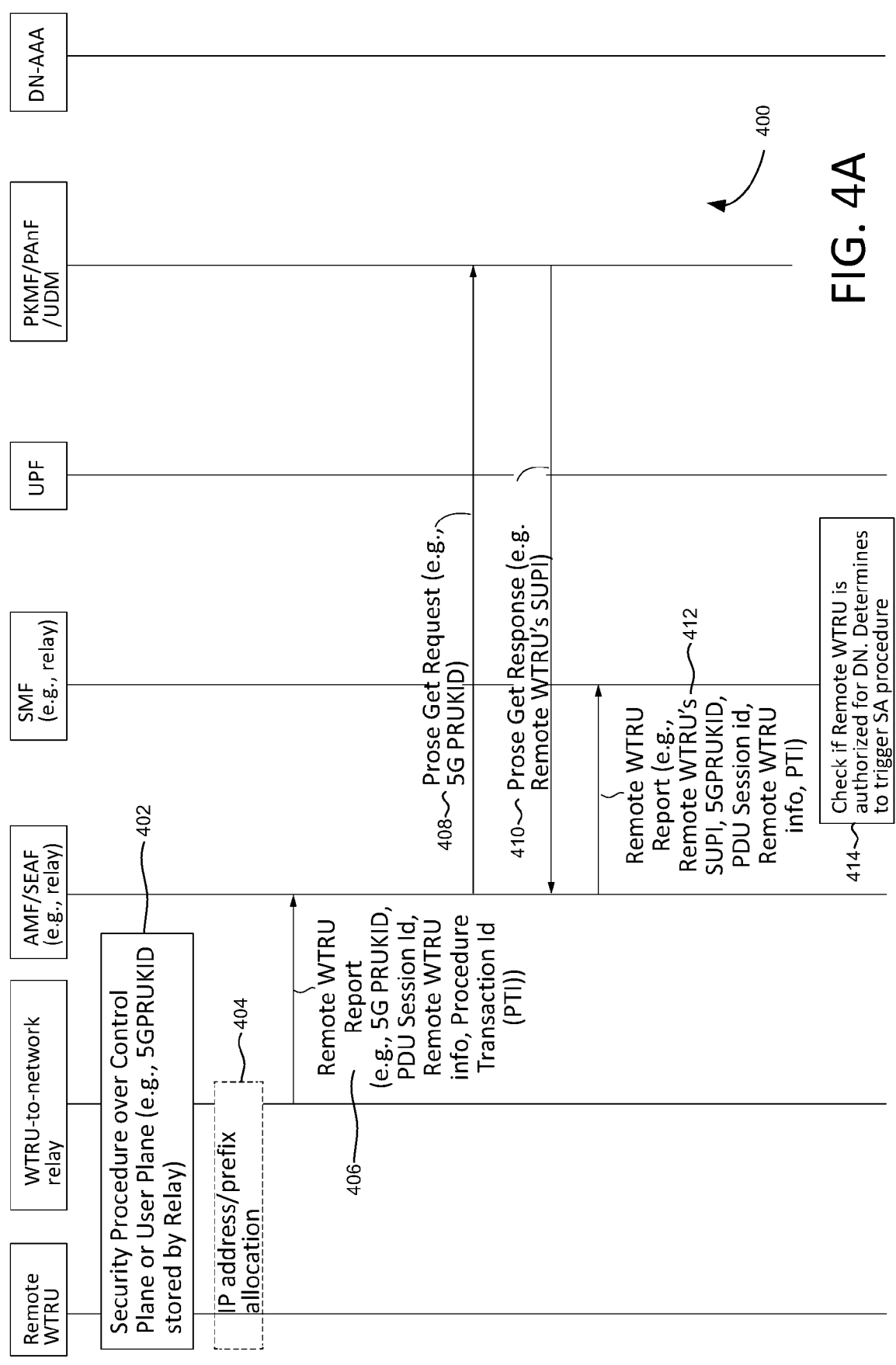
FIGS. 4A and 4B illustrate an example associated with protocol date unit (PDU) session secondary authentication and authorization (A&A) procedures performed via Layer 3 WTRU-to-network relay.
Figure 4B:
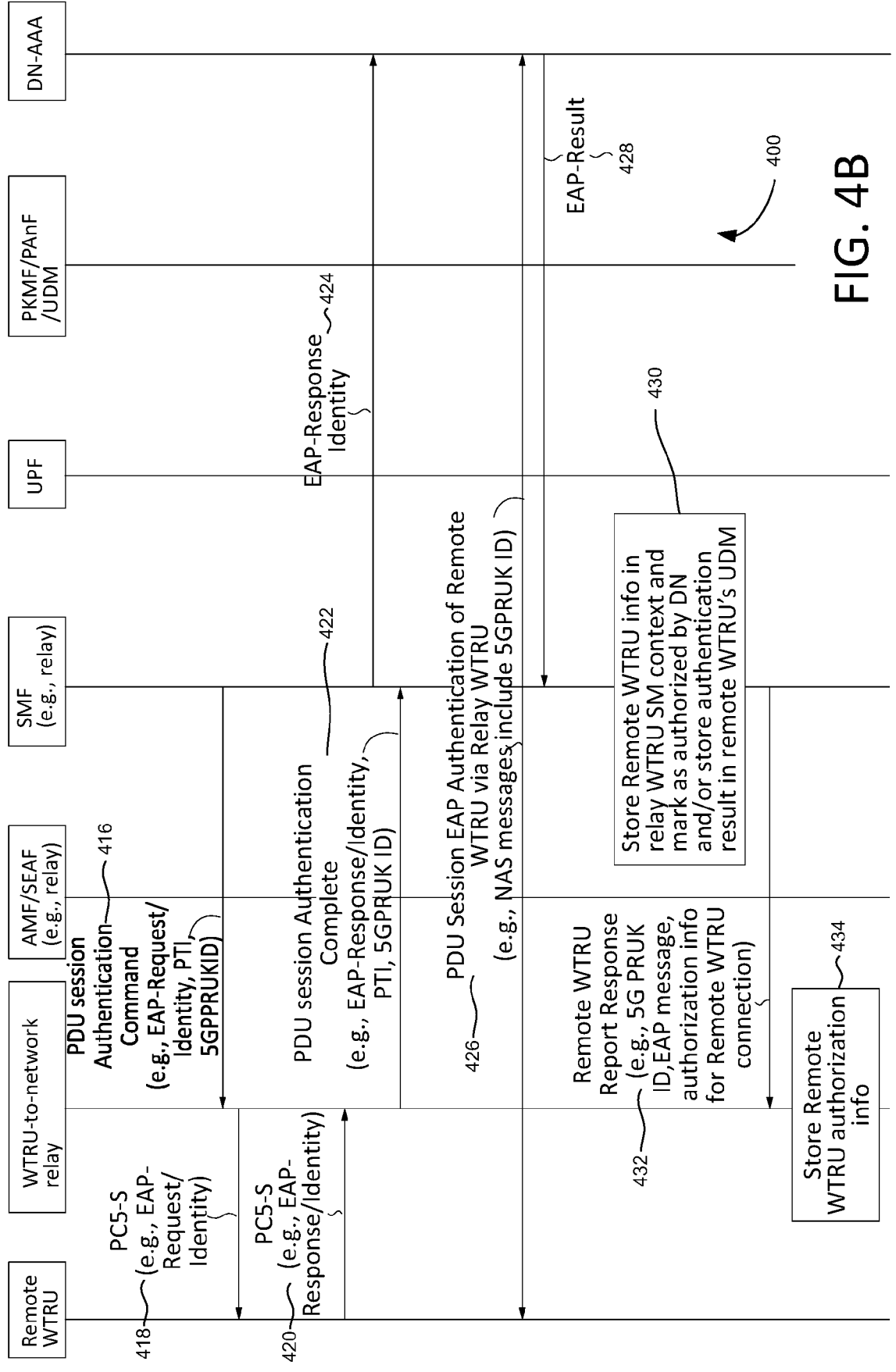

Secondary authentication and authorization (A&A) procedures associated with a PDU session may be performed. For example, secondary A&A procedures associated with a PDU session may be performed via a WTRU-to-network relay. FIGS. 4A and 4B illustrate an example 400 associated with PDU session secondary A&A procedures performed via a WTRU-to-network relay. One or more of the following may apply. As illustrated in FIGS. 4A and 4B, the session secondary A&A procedures may be performed for a Remote WTRU during a Remote WTRU report procedure. The example illustrated in FIGS. 4A and 4B supports both control plane and user plane security procedures.

As shown in FIGS. 4A and 4B, a Remote WTRU and/or a WTRU-to-network relay may establish a PC5 link (e.g., using a control plane security procedure and/or user plane security procedure 402 as described herein, for example with respect to FIGS. 2 and/or 3A and 3B) associated with a key identifier (e.g., 5GPRUK/5GPRUK ID) exchange. The WTRU-to-network relay may store the 5GPRUK ID for the Remote WTRU, as described herein. At 404, the Remote WTRU and/or WTRU-to-network relay may perform IP configuration for communication over the PC5 link.

At 406, the WTRU-to-network relay may transmit a Remote WTRU report message. The WTRU-to-network relay may transmit a Remote WTRU report message to the SMF (e.g., via AMF). For example, the Remote WTRU report message may include one or more of the 5GPRUK ID, PDU session ID and/or other parameters.

At 408, the AMF may transmit a request message to a network function (e.g., PAnF, UDM, PKMF). The request message may include the 5GPRUK ID. At 410, the AMF may receive a response message from the network function. The response message may include one or more of a key identifier (e.g., a 5GPRUK ID associated with the Remote WTRU), the SUPI associated with the Remote WTRU, and or one or more other parameters (e.g., associated with the Remote WTRU).

As illustrated in FIG. 4A, at 412, the AMF may forward the SUPI (e.g., associated with the Remote WTRU), 5GPRUK ID (e.g., associated with the Remote WTRU), and/or the report message (e.g., associated with the Remote WTRU) to the SMF. Additionally, or alternatively, the AMF may identify a network function (NF). For example, the AMF may identify a NF from which to retrieve the information associated with the Remote WTRU (e.g., SUPI) and/or forward information associated with the WTRU (e.g., 5GPRUK ID) to the SMF. The SMF may query the identified NF (e.g., providing the Remote WTRU's 5GPRUK ID). For example, in response to receiving this information from the AMF, the SMF may query the identified NF (e.g., providing 5GPRUK ID associated with the Remote WTRU). Querying the identified NF may be to obtain the SUPI associated with the Remote WTRU. At 414, the SMF may check for DN authorization for the Remote WTRU. For example, the SMF may check for DN authorization for the Remote WTRU using the SUPI associated with the Remote WTRU. Additionally, or alternatively, the SMF may retrieve DN subscription information for the Remote WTRU from a UDM. The SMF may (e.g., based on information received from the UDM) determine one or more of the following: whether DN is authorized for the Remote WTRU, whether DN requires secondary authentication for the Remote WTRU, and whether the Remote WTRU has a valid authentication and/or authorization result (e.g., from a prior authentication procedure). The SMF may trigger a Remote WTRU secondary authentication by DN. Based on these determinations, for example, the SMF may trigger a Remote WTRU secondary authentication by DN. The SMF may store the WTRU secondary authentication result in the WTRU-to-network relay context and/or in the UDM associated with the Remote WTRU.

As shown in FIG. 4B, at 416, the SMF may transmit a PDU session authentication command. The PDU session authentication command may be transmitted to the WTRU-to-network relay (e.g., Layer 3 WTRU-to-network relay). For example, the PDU session authentication command may include the 5GPRUK ID. The 5GPRUK ID may be used to identify the Remote WTRU to be authenticated. At 418, the Layer 3 WTRU-to-network relay may send a PC5-S message to the Remote WTRU. At 420, the Remote WTRU may send a PC5-S response message to the Layer 3 WTRU-to-network relay. The Layer 3 WTRU-to-network relay may determine that the PDU session authentication command is for the Remote WTRU (e.g., based on 5GPRUK ID, and transmit it over the associated PC5 link). At 422, the Layer 3 WTRU-to-network relay may forward an authentication response (e.g., received from the Remote WTRU). For example, the authentication response may be forwarded to the SMF. For example, the authentication response may include the 5GPRUK ID. At 424, the SMF may initiate a Remote WTRU authentication by DN, for example, by sending an extensible authentication protocol (EAP)-response/identity to the data network-authentication authorization and accounting (DN-AAA). The DN-AAA and Remote WTRU may exchange authentication messages (e.g., as defined by the relevant authentication method). The SMF and Layer 3 WTRU-to-network relay may exchange the authentication messages over NAS, for example, by including the 5GPRUK ID in the NAS messages. At 428, the SMF may receive a final authentication result from DN-AAA. At 426, the final authentication result may be received when the authentication procedure completes. At 430, the SMF may store the authentication result in the WTRU-to-network relay's context and/or in the UDM associated with the Remote WTRU.

At 432, the SMF may transmit a Remote WTRU report response message. The report response message may include the 5GPRUK ID and/or authentication and authorization results. Additionally, or alternatively, the 5GPRUK ID and/or authentication and authorization results may be transmitted to the Layer 3 WTRU-to-network relay. The Layer 3 WTRU-to-network relay may provide the Remote WTRU with access to the PDU session (e.g., based on the authentication and authorization result in the Remote WTRU report response message). At 434, the Layer 3 WTRU-to-network relay may store authorization information associated with the Remote WTRU, and/or forward authentication and authorization result to the Remote WTRU. The Layer 3 WTRU-to-network relay may proceed with the communication setup procedure. For example, if the PDU session secondary A&A for the Remote WTRU is successful, the Layer 3 WTRU-to-network relay may proceed with the communication setup procedure. The Layer 3 WTRU-to-network relay may release the PC5 link with the Remote WTRU. For example, if the PDU session secondary A&A for the Remote WTRU is not successful, the Layer 3 WTRU-to-network relay may release the PC5 link with the Remote WTRU.

Figure 5A:
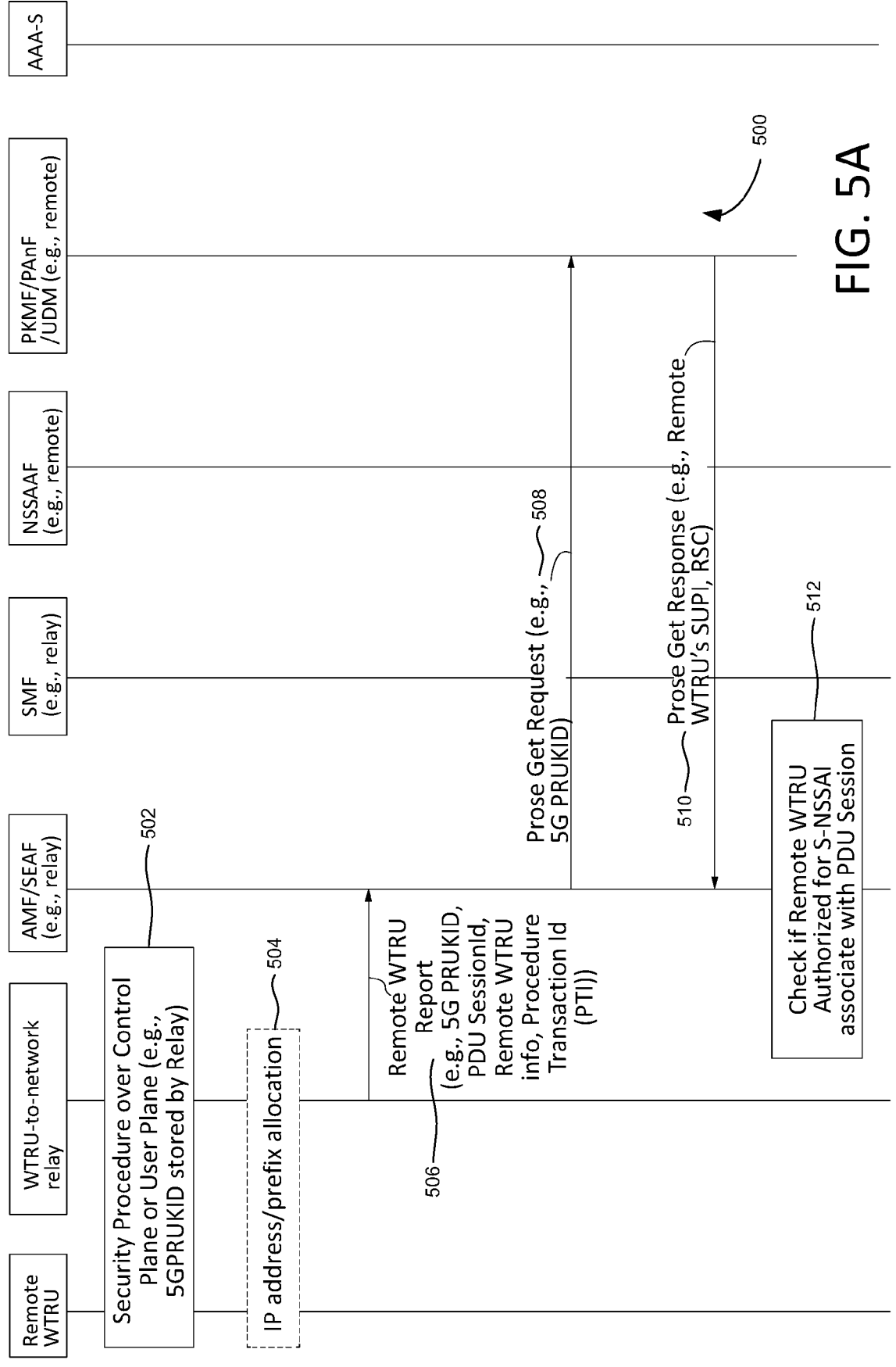
FIGS. 5A and 5B illustrates an example associated with network slice specific authentication and/or authorization (NSSAA) procedures performed via a Layer 3 WTRU-to-network relay.
Figure 5B:
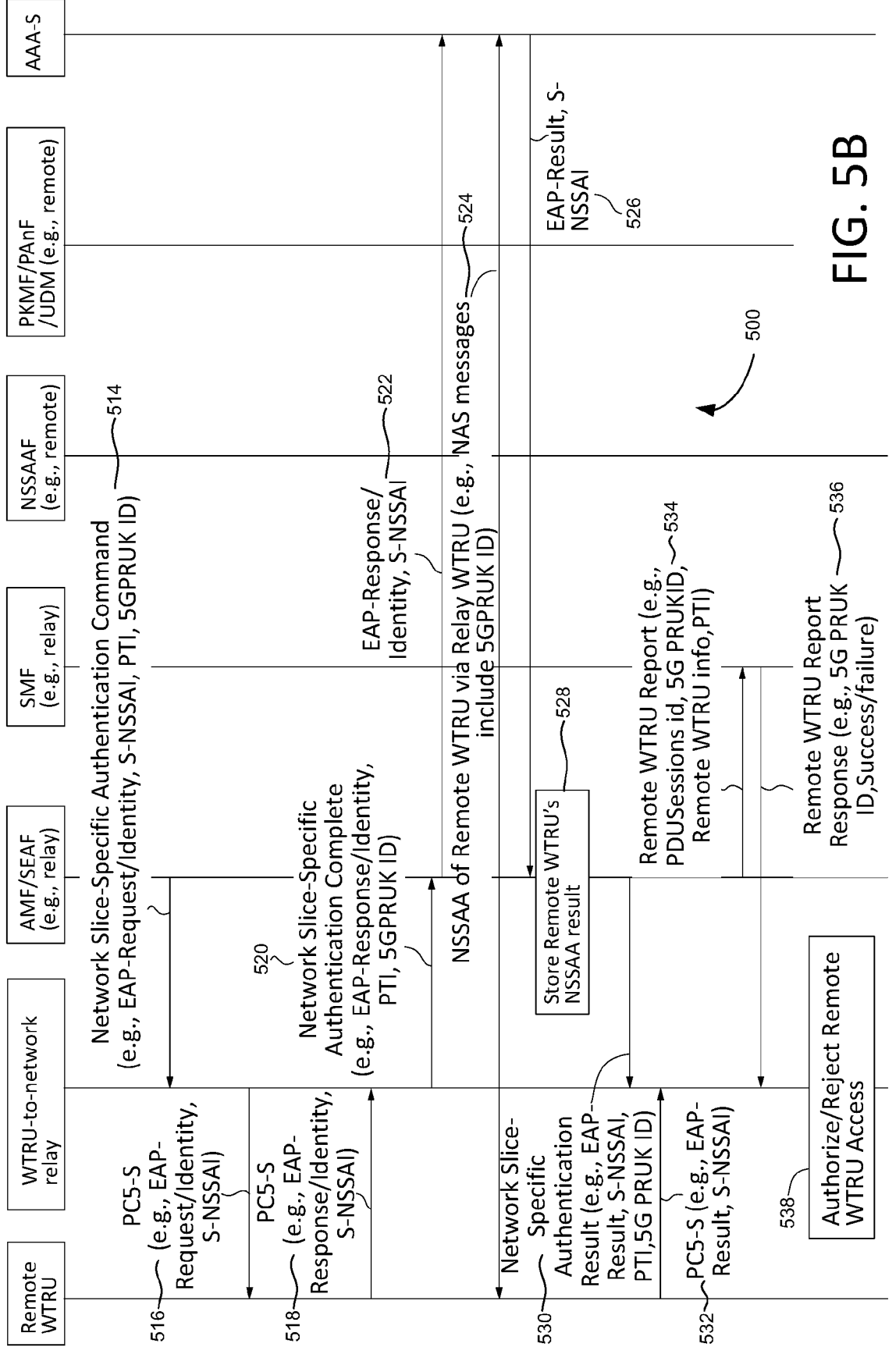

NSSAA procedures may be performed via a Layer 3 WTRU-to-network relay. One or more of the following may apply. FIGS. 5A and 5B illustrate an example 500 associated with NSSAA procedures performed via a Layer 3 WTRU-to-network relay. As illustrated in the example 500, the NSSAA procedures may be associated with a Remote WTRU and/or a Remote WTRU report procedure. The Remote WTRU may be associated with a Remote WTRU key identifier (e.g., 5GPRUK/5GPRUK ID), which may be used (e.g., exchanged) during the NSSAA procedures. The example illustrated in FIGS. 5A and 5B may used with control plane security procedures and/or user plane security procedures.

As shown in FIG. 5A, a Remote WTRU and/or WTRU-to-network relay may establish a PC5 link 500 (e.g., using a control plane security procedure and/or user plane security procedure, for example as described herein with respect to FIGS. 2 and 3). As described herein, the Layer 3 WTRU-to-network relay may store the 5GPRUK ID associated with the Remote WTRU. At 504, the Remote WTRU and/or WTRU-to-network relay may perform IP configuration for the PC5 link communication.

At 506, the WTRU-to-network relay may transmit a Remote WTRU report message to the SMF (e.g., via AMF). For example, the Remote WTRU report message may include one or more of the key identifier (e.g., 5GPRUK ID associated with the Remote WTRU), PDU Session ID (e.g., associated with the Remote WTRU), and/or other parameters (e.g., Remote WTRU info, procedure transaction ID (PTI), associated with the Remote WTRU).

At 508, the AMF may transmit a request (e.g., a Prose get request) to a NF (e.g., PAnF, UDM, PKMF). The request transmitted at 508 may, for example, include the key identifier (e.g., 5GPRUK ID). At 510, the AMF may receive a response (e.g., a Prose get response) to the request message from the NF. For example, the response received from the NF may include one or more of a key identifier (e.g., a 5GPRUK ID associated with the Remote WTRU), the SUPI associated with the Remote WTRU, and or one or more other parameters (e.g., RSC, associated with the Remote WTRU). At 512, the AMF may check for a S-NSSAI authorization for the Remote WTRU (e.g., using the Remote WTRU's SUPI and S-NSSAI information). For example, the AMF may retrieve S-NSSAI information from the WTRU-to-network relay's PDU session context (e.g., using the PDU session ID). The AMF may retrieve S-NSSAI subscription information for the Remote WTRU. S-NSSAI subscription information for the Remote WTRU may be retrieved from the UDM. For example, the AMF may (e.g., based on the information received from the UDM) determine one or more of the following: whether the S-NSSAI is authorized; whether the S-NSSAI requires NSSAA for the Remote WTRU; and/or whether the Remote WTRU has a valid authentication and authorization result (e.g., from a prior NSSAA procedure). The AMF may trigger NSSAA for the Remote WTRU. For example, based on these determinations, the AMF may trigger NSSAA for the Remote WTRU. The AMF may forward the SUPI associated with the Remote WTRU and/or report message associated with the Remote WTRU to the SMF.

As illustrated in FIG. 5B, at 514, the AMF may transmit a network slice-specific authentication command to the Layer 3 WTRU-to-network relay. The network slice-specific authentication command may include the key identifier (e.g., 5GPRUK ID). For example, the key identifier (e.g., 5GPRUK ID) may be used to identify/authenticate the Remote WTRU to be authenticated. For example, the Layer 3 WTRU-to-network relay (e.g., Relay WTRU) may determine that the request is associated with the Remote WTRU based on key identifier (e.g., 5GPRUK ID), as the Layer 3 WTRU-to-network relay may be communicating with multiple remote WTRUs. At 516, the Layer 3 WTRU-to-network relay may transmit the request over the PC5 link associated with the Remote WTRU, e.g., based on the key identifier. At 518, the Remote WTRU may send an authentication response to the Layer 3 WTRU-to-network relay. At 520, the Layer 3 WTRU-to-network relay may send an authentication response from the Remote WTRU. In some examples, the WTRU-to-network relay may forward the authentication response from the Remote WTRU. The authentication response may be forwarded to the SMF. For example, the authentication response may include the 5GPRUK ID associated with the Remote WTRU. The SMF may initiate an NSSAA procedure for the Remote WTRU, for example at 522, by transmitting an EAP-response/identity to the authentication authorization and accounting-server (AAA-S). At 524, the AAA-S and the Remote WTRU may exchange authentication messages (e.g., as defined by the relevant authentication methods). The AMF and the Layer 3 WTRU-to-network relay may exchange authentication messages over NAS. For example, the AMF and the Layer 3 WTRU-to-network relay may exchange authentication messages over NAS by including the 5GPRUK ID in the NAS messages. At 526, the AMF may receive an authentication result from the AAA-S (e.g., when the authentication procedure completes). At 528, the AMF may store the authentication result in the context associated with the WTRU-to-network relay (e.g., using the relevant key identifier) and/or in the UDM associated with the Remote WTRU. At 530, the AMF may transmit an authentication result message to the Layer 3 WTRU-to-network relay. For example, the authentication result message may include the 5GPRUK ID and/or authorization information (e.g., whether S-NSSAI is authorized). The Layer 3 WTRU-to-network relay may forward the authentication and/or authorization result to the Remote WTRU.

The AMF may proceed with the Remote WTRU report procedure. At 534, for example, the AMF may proceed with the Remote WTRU report procedure by forwarding the SUPI associated with the Remote WTRU and/or a Remote WTRU report message to the SMF. The AMF may include an indication of whether the Remote WTRU was successfully authenticated and/or authorized for the S-NSSAI associated with the PDU session. The indication of whether the Remote WTRU was successfully authenticated and/or authorized for the S-NSSAI associated with the PDU session may be included in the message forwarded to the SMF.

At 536, the SMF may transmit a Remote WTRU report response message to the WTRU-to-network relay. For example, the Remote WTRU report response message may include the 5GPRUK ID and/or the authentication and authorization result.

At 538, the Layer 3 WTRU-to-network relay may provide the Remote WTRU with access to the PDU session (e.g., based on the authentication and authorization result included in the Remote WTRU report response message). The Layer 3 WTRU-to-network relay may store the authorization information for the Remote WTRU. For example, the Layer 3 WTRU-to-network relay may store the authorization information for the Remote WTRU if the response message indicates a successful authentication and authorization. The Layer 3 WTRU-to-network relay may release the PC5 link with the remote. For example, if the response message indicates that authentication and authorization was not successful, the Layer 3 WTRU-to-network relay may release the PC5 link with the remote.

What is claimed:

1. A network node comprising:
   a processor configured to:
   receive, from a relay wireless transmit/receive unit (WTRU), a remote WTRU report message that comprises a ProSe remote user key (PRUK) identifier (ID) of a remote WTRU;
   send, to a network function, a request message to obtain a subscription permanent identifier (SUPI) of the remote WTRU, the request message comprising the PRUK ID of the remote WTRU; and
   receive, from the network function, a response message that comprises the SUPI of the remote WTRU, wherein the SUPI of the remote WTRU was determined using the PRUK ID of the remote WTRU.

2. The network node of claim 1, wherein the processor is further configured to store the PRUK ID and the SUPI of the remote WTRU in a context of the relay WTRU.

3. The network node of claim 1, wherein the PRUK ID comprises a 5G PRUK ID.

4. The network node of claim 1, wherein the network node is a session management function (SMF) and the network function is a ProSe key management function (PKMF) or a ProSe Anchor Function (PAnF).

5. The network node of claim 1, wherein the processor is further configured to send, to the relay WTRU, a remote WTRU report response message that comprises the PRUK ID.

6. The network node of claim 5, wherein the remote WTRU report response message indicates one or more of an authentication result or an authorization result.

7. The network node of claim 1, wherein the processor is configured to check for data network authorization for the remote WTRU using the SUPI of the remote WTRU.

8. The network node of claim 7, wherein the processor is further configured to trigger a secondary authentication by a data network (DN) for the remote WTRU.

9. The network node of claim 8, wherein the secondary authentication is triggered based on a determination of one or more of DN being authorized, DN requiring secondary authentication, or a prior authentication.

10. The network node of claim 8, wherein the processor is further configured receive, from the relay WTRU, an authentication response message associated with the remote WTRU.

11. A method performed by a network node, the method comprising:

receiving, from a relay wireless transmit/receive unit (WTRU), a remote WTRU report message that comprises a ProSe remote user key (PRUK) identifier (ID) of a remote WTRU;

sending, to a network function associated with the remote WTRU, a request message to obtain a subscription permanent identifier (SUPI) of the remote WTRU, the request message comprising the PRUK ID of the remote WTRU; and receiving, from the network function, a response message that comprises the SUPI of the remote WTRU, wherein the SUPI of the remote WTRU was determined using the PRUK ID of the remote WTRU.

12. The method of claim 11, further comprising storing the PRUK ID and the SUPI of the remote WTRU in a context of the relay WTRU.

13. The method of claim 11, wherein the PRUK ID comprises a 5G PRUK ID.

14. The method of claim 11, wherein the network node is a session management function (SMF) and the network function is a ProSe key management function (PKMF) or a ProSe Anchor Function (PAnF).

15. The method of claim 11, further comprising sending, to the relay WTRU, a remote WTRU report response message that comprises the PRUK ID.

16. The method of claim 15, wherein the remote WTRU report response message indicates one or more of an authentication result or an authorization result.

17. The method of claim 11, further comprising checking for data network authorization for the remote WTRU using the SUPI of the remote WTRU.

18. The method of claim 17, further comprising triggering a secondary authentication by a data network (DN) for the remote WTRU.

19. The method of claim 18, wherein the secondary authentication is triggered based on a determination of one or more of DN being authorized, DN requiring secondary authentication, or a prior authentication.

20. The method of claim 18, further comprising receiving, from the relay WTRU, an authentication response message associated with the remote WTRU.

* * * * *